United States Patent [19]

Hehl

[11] Patent Number: 4,704,078
[45] Date of Patent: Nov. 3, 1987

[54] COUPLING DEVICE FOR AN EXCHANGEABLE WORKING UNIT IN AN INJECTION MOLDING MACHINE

[76] Inventor: Karl Hehl, Arthur-Hehl-Strasse 32, D-7298 Lossburg 1, Fed. Rep. of Germany

[21] Appl. No.: 852,340

[22] Filed: Apr. 15, 1986

[30] Foreign Application Priority Data

Apr. 15, 1985 [DE] Fed. Rep. of Germany ....... 3513412
Aug. 6, 1985 [DE] Fed. Rep. of Germany ....... 3528154

[51] Int. Cl.$^4$ ............................................ B29C 45/17
[52] U.S. Cl. .................................. 425/185; 425/192 R; 425/567
[58] Field of Search .................... 425/185, 183, 192 R, 425/567, 542, 574, 575, 585–587, 595

[56] References Cited

U.S. PATENT DOCUMENTS

| 3,510,915 | 5/1970 | Johansson | 425/192 X |
| 3,594,869 | 7/1971 | Sher | 425/192 |
| 4,116,599 | 9/1978 | Ruegg | 425/192 |
| 4,473,346 | 9/1984 | Hehl | 425/185 X |

FOREIGN PATENT DOCUMENTS 3229223  4/1983  Fed. Rep. of Germany .
3151859 10/1983  Fed. Rep. of Germany .

Primary Examiner—Richard L. Chiesa
Attorney, Agent, or Firm—Spencer & Frank

[57] ABSTRACT

An injection molding machine has an exchangeable working unit including an injection mold assembly and a plasticizing unit. The latter has a plasticizing cylinder and a feed screw. The machine further has a drive, including a spindle for imparting a rotation and a periodic axial shifting motion to the feed screw. There is further provided a coupling assembly for operatively connecting the feed screw to and disconnecting it from the spindle. The coupling assembly has radially displaceable locking bolts, springs urging the locking bolts into a locking position, a radially guided expander wedge driving the locking bolts away from one another into a releasing position, a radially oriented piston-and-cylinder unit for moving the expander wedge between the locking bolts and an axially displaceable radial coupling. The feed screw shaft has a circumferential groove into which the locking bolts project in their locking position, for axially immobilizing the feed screw relative to the spindle. The feed screw shaft also has a radial recess for receiving the radial coupling for torque-transmittingly connecting the feed screw with the spindle. The machine also has an orienting device for stopping a common rotation of the bolts and the radial coupling in a desired angular position of the radial clearance between the locking bolts in which the clearance is oriented parallel to the working direction of the radially oriented piston-and-cylinder unit.

14 Claims, 19 Drawing Figures

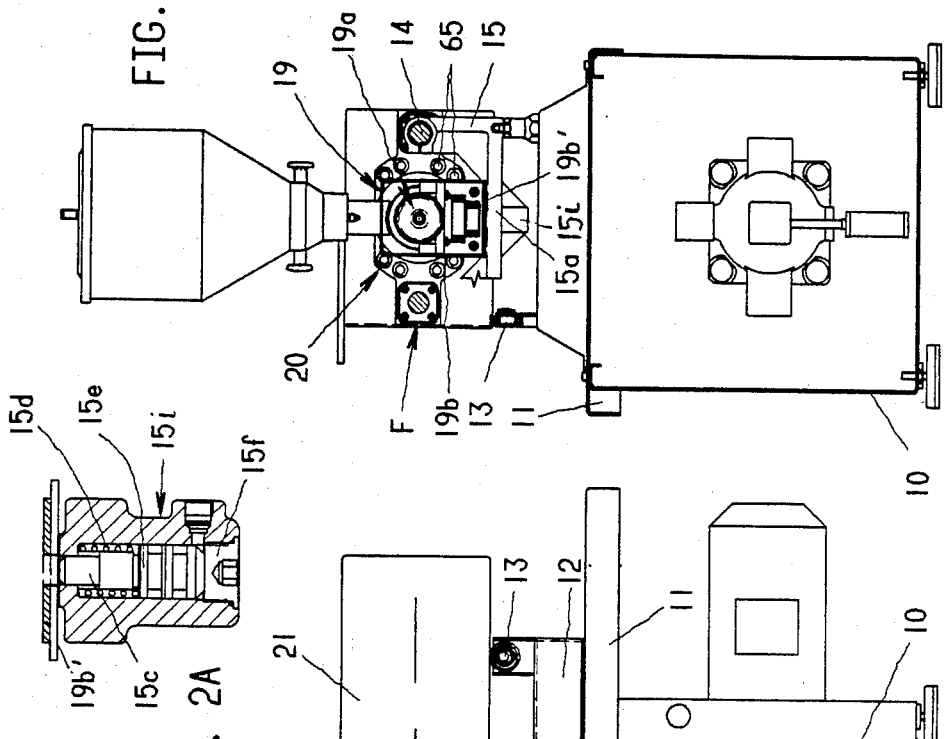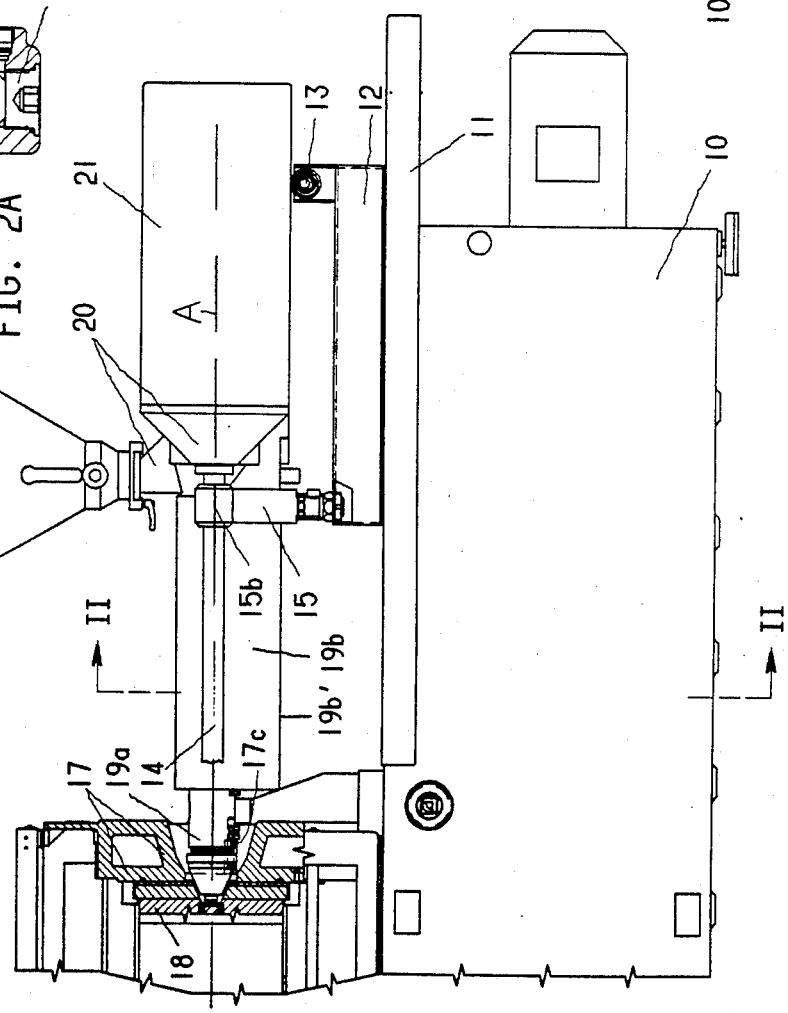

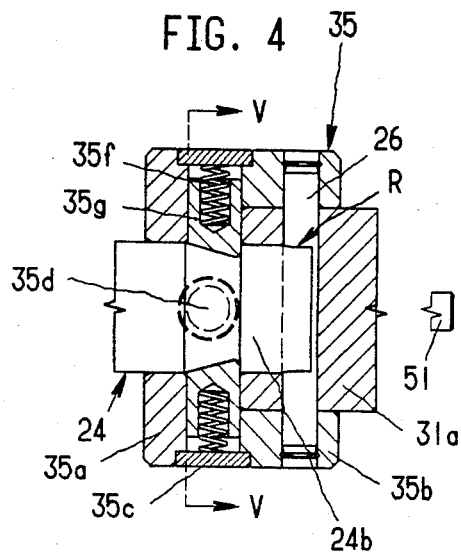
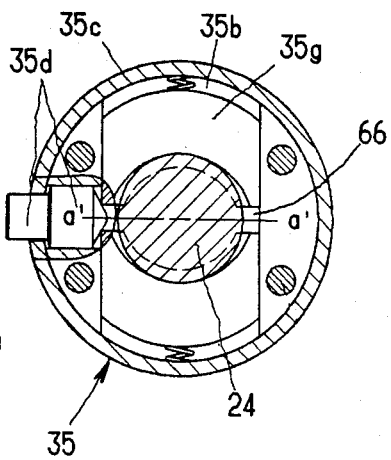
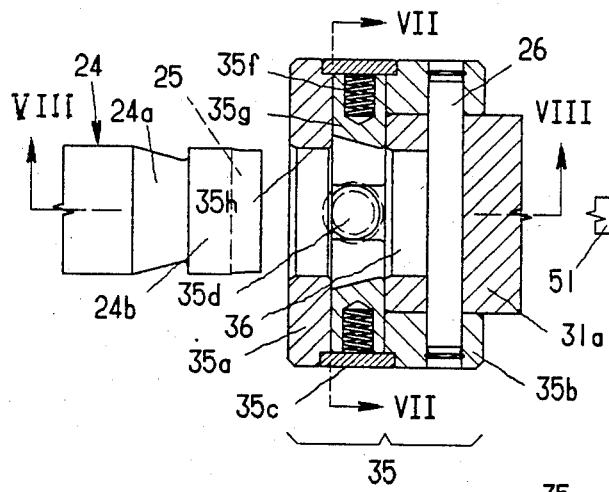
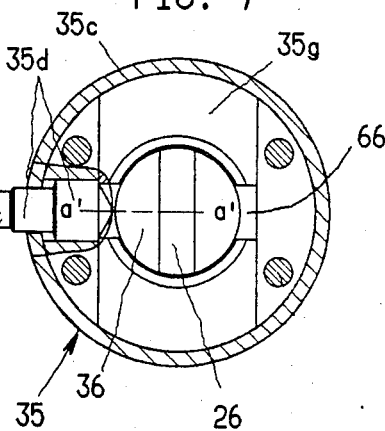
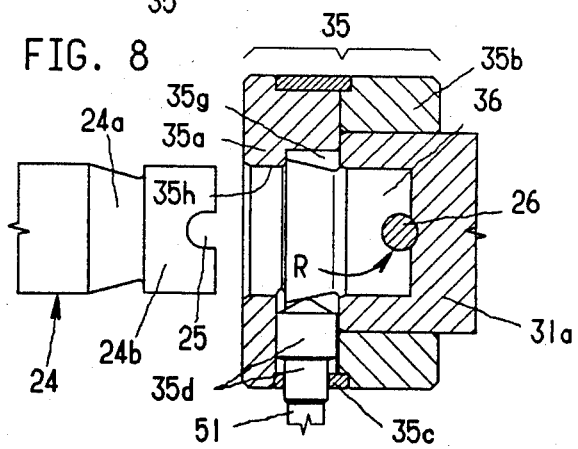

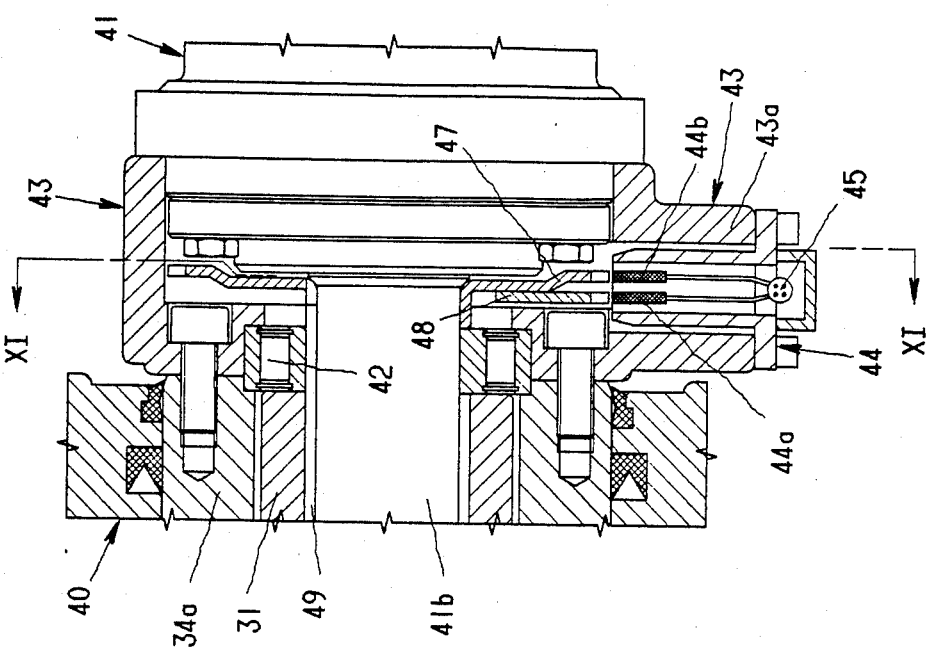
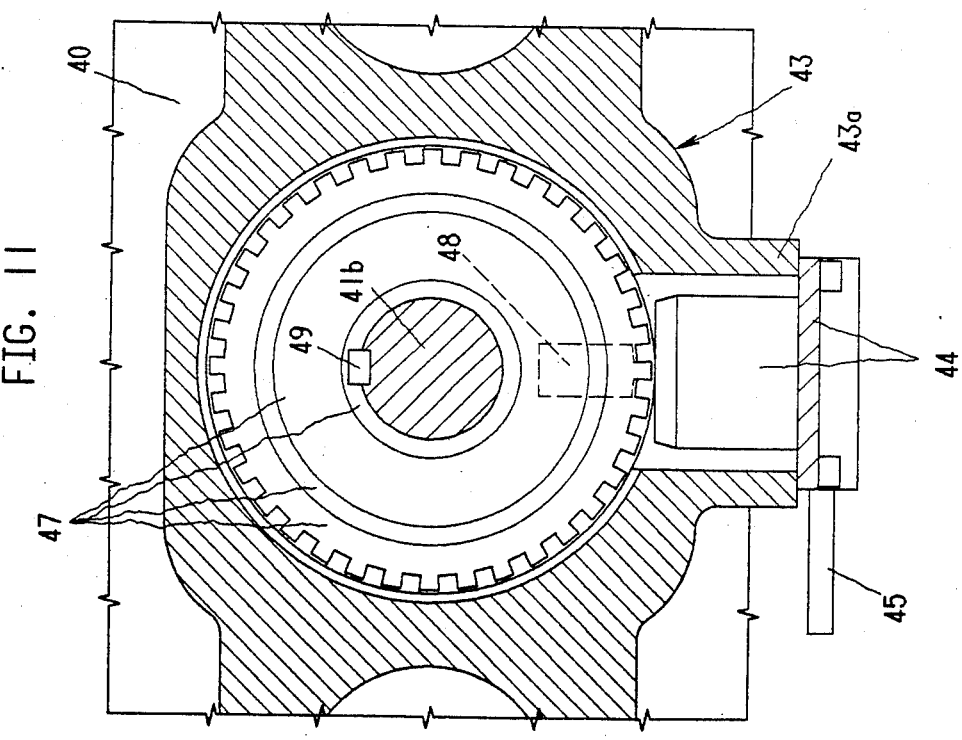

COUPLING DEVICE FOR AN EXCHANGEABLE WORKING UNIT IN AN INJECTION MOLDING MACHINE

BACKGROUND OF THE INVENTION

This invention relates to an injection molding machine and is particularly concerned with a coupling device associated with an automatically exchangeable working unit (formed of an injection mold assembly and a plasticizing unit) which may be moved away from the machine in a direction transverse to the axis of the injection. The coupling device serves to axially connect a periodically moved component of the working unit with an associated hydraulic driving device aligned with the axis of injection. The coupling device is of the type which has slidable locking bolts arranged diametrically relative to the axis of the injection and which, for effecting a coupling, may be moved by springs into an annular groove of one of the coupling components and are radially guided in a locking bolt housing which is affixed to the other coupling part. The coupling device further has a radially guided expander wedge which, for withdrawing the locking bolts from the annular groove, may be driven to a slight extent into a linear clearance between the locking bolts by means of a radially oriented piston-and-cylinder unit.

In an injection molding machine equipped in the above manner the injection molding unit may be attached to and withdrawn from the injection mold assembly accommodated in a mold closing unit, by means of at least one hydraulic power cylinder.

A known coupling device of the above-outlined type, as disclosed in German Patent No. 3,151,859, to which corresponds U.S. application Ser. No. 338,885, filed Jan. 12th, 1982, now abandoned, serves for effecting a releasable connection of the injection mold assembly (working unit) with its hydraulic drive. The separability of the drive from the working unit is an essential precondition for performing a centrally controlled exchange of the injection mold assembly (working unit) by means of a computer of the injection molding machine, wherein the working unit is removed or introduced in a direction transverse to the axis of injection. In order to be able to perform such a transverse conveyance, it is required to withdraw the coupling part provided with the annular groove from the locking bolt housing of the other coupling part in an axial direction thus rendering it free for transverse conveyance. This is achieved in the prior art construction by an axial stroke of the drive mechanism which is aligned with the axis of injection and which has to be designed to perform a correspondingly longer (relatively large) stroke. Since the sliding bolts work as radially locking members, very large torque loads may be taken up without the risks of damage.

German Offenlegungsschrift (Non-examined Published patent application) No. 3,229,223 discloses a coupling device which serves for connecting the feed screw rotating in the plasticizing cylinder and being capable of axial displacement, with a spindle which delivers a torque and also an axial shifting force. In this coupling device too, the axial stroke permitting a subsequent transverse conveyance is performed with the aid of a drive aligned with the axis of injection. The torque of the spindle is transmitted to the shaft of the feed screw by means of an overrunning clutch. Axial loads are taken up by an axial coupling which is constructed in a radially symmetrical manner, in alignment with the axis of injection and which is actuated by a separate, coaxial hydraulic drive cylinder that rotates with the coupling device. The supply of the hydraulic fluid thus involves additional structure and expense.

SUMMARY OF THE INVENTION

It is an object of the invention to provide an improved robust coupling device of the above-outlined type, operating with radially slidable locking bolts, which permits the feed screw to be connected in the radially positively locked state with a driving spindle delivering a torque and an axial displacing force.

This object and others to become apparent as the specification progresses, are accomplished by the invention, according to which, briefly stated, with the coupling device (axial locking device) for connecting a rotatable and axially displaceable feed screw accommodated in the plasticizer cylinder, with a driving spindle delivering a torque and an axial shifting force, there is associated a form-fitting, axially withdrawable radial coupling as well as an orienting device by means of which the joint rotary motion of the axial locking device and the radial coupling device may be stopped in a desired angular position of the locking bolt clearance which, in its desired angular position, extends parallel to the working direction of the radial cylinder.

In a construction according to the invention as outlined above, the arbitrarily reproducible desired angular position of the locking bolt clearance corresponds to an engagement profile which forms part of the radial coupling and which is situated necessarily in the desired angular position at the feed screw. Since the radial cylinder is stationary, it can assume, during a simple, non-problematic supply of the hydraulic medium, several functions which need to be performed simultaneously during the replacement of the plasticizing unit, such as controlling all the radially slidable locking bolts of the coupling device and controlling, for example, a stopping device for axially immobilizing the plasticizing unit.

According to a further feature of the invention, it is ensured that the locking bolts of the coupling device may be expanded radially by means of expander wedges during the axial introduction of the feed screw of an exchanged plasticizing unit and further, the engagement profiles of the coupling parts are situated in a radial position (standby-to-advance position). The orienting device includes an inductive rpm signal receiver, providing for an rpm measurement.

According to a further feature of the invention, a reduced structural length of the injection molding unit is possible, because the axial displacement of the coupling parts making possible the transverse conveyance of the plasticizing unit is effected by power cylinders which are situated externally of the axis of injection and therefore they may axially intersect the hydraulic driving device (injection cylinder) aligned with the axis of injection.

According to a further feature of the invention, favorable preconditions are provided for a rational mass production, ensuring a reliable rear-side centering of the feed screw.

In case the desired angular position of the locking bolt clearance and thus also the desired angular position of the spindle-side engagement profile of the radial coupling is, by means of the orienting device, only approximately reached then such a desired angular position is fully reached by ensuring, according to a further feature of the invention, an axial meeting of the coupling halves.

BRIEF DESCRIPTION OF THE DRAWING

FIG. 1 is a side elevational view, partially in section, of an injection molding machine, incorporating the invention.

FIG. 2 is a sectional view taken along line II—II of FIG. 1.

FIG. 2A is an enlarged sectional detail of the construction shown in FIG. 2.

FIG. 4 is a sectional view of an axial bolting device for the feed screw and the radial coupling, illustrated in a connected state.

FIG. 5 is a sectional view taken along line V—V of FIG. 4.

FIG. 6 is a sectional view of an axial bolting device for the feed screw and the radial coupling, illustrated in a disconnected state.

FIG. 7 is a sectional view taken along line VII—VII of FIG. 6.

FIG. 8 is a sectional view taken along line VIII—VIII of FIG. 6.

FIG. 11 is a sectional view taken along line XI—XI of FIG. 12.

FIG. 12 is a sectional illustration, on an enlarged scale, of components shown in FIG. 3.

DESCRIPTION OF THE PREFERRED EMBODIMENTS

Figure 3:
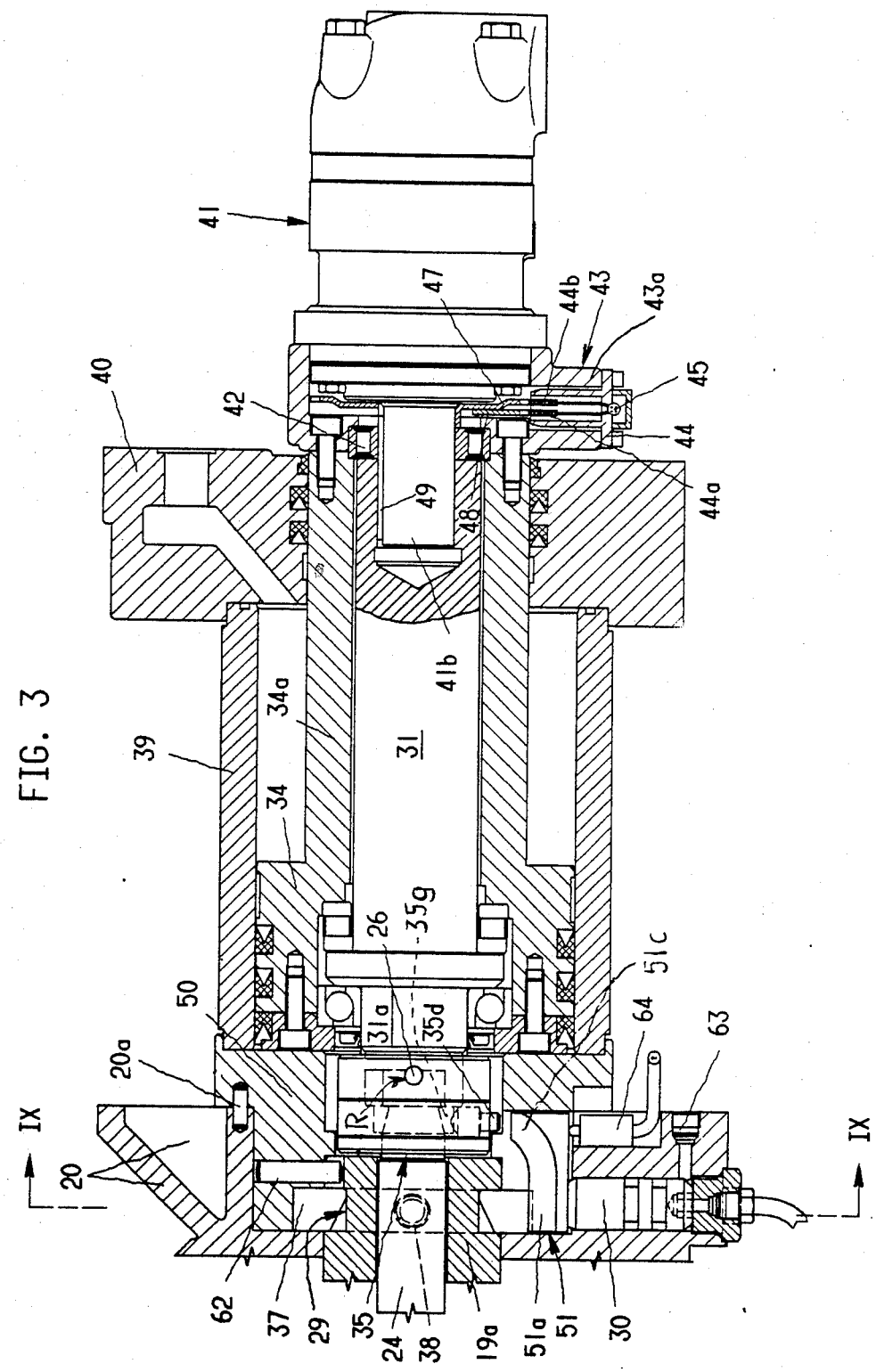
FIG. 3 is an axial sectional view of an injection molding unit forming one part of the structure shown in FIG. 1, illustrated on an enlarged scale.

Two preferred embodiments will be described in conjunction with FIGS. 1-12 and 13-18, respectively. Identically structured components having the same function in the two embodiments are given identical reference numerals whereas differently configured components of essentially the same function are designated with the same reference numeral, provided with a prime sign in FIGS. 13-18.

Figure 13:
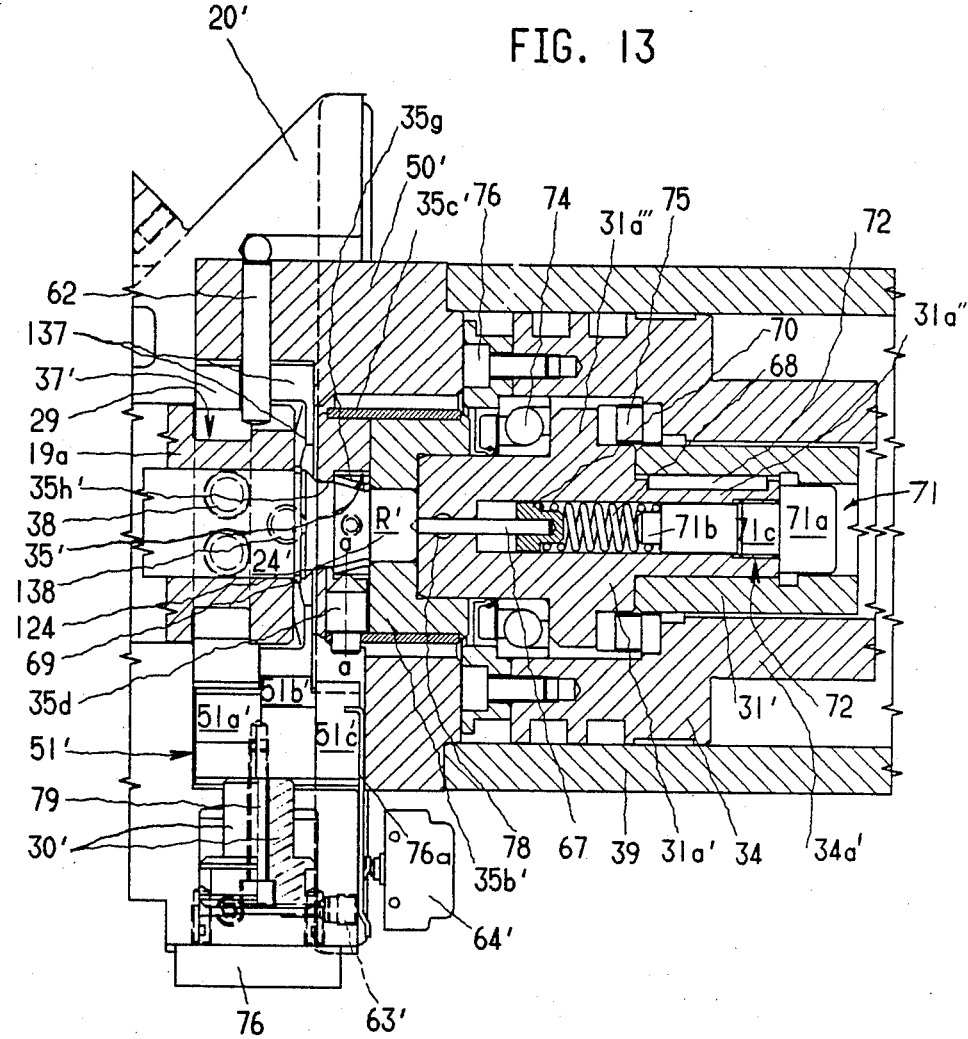
FIG. 13 is a sectional elevational view of a further embodiment of the invention, shown in an orientation similar to FIG. 3.

The coupling device is intended to serve an automatically exchangeable plasticizing unit of an injection molding machine. The coupling device therefore has an axial locking device for a plasticizing cylinder 19a and an axial locking device for a feed screw 24, 24' for connecting the feed screw 24, 24' to, and disconnecting it from a hydraulic injection cylinder 34, 39 (FIGS. 3, 13, 14) disposed in alignment with the injection axis A. As shown, for example, in FIG. 6, the coupling device further includes radially slidable locking bolts 35g which are arranged diametrically relative to the axis of injection and which, for effecting a coupling, may be advanced by means of springs 35f into an annular groove 24a of the shaft of the feed screw 24, 24'. The locking bolts 35g are radially guided in a bolt housing 35, 35' which is secured fixedly to a spindle 31, 31' which imparts a rotation and axial displacements on the feed screw 24, 24'. For disconnecting the axial coupling there is provided a radially guided expander wedge 35d (FIGS. 5, 7 and 8). The latter, for moving the locking bolts 35g out of the annular groove 24a, is movable slightly into a clearance 66 defined between the locking bolts 35g by means of a radially disposed piston-and-cylinder unit comprising a radial cylinder 30, 30' (FIGS. 3, 13). With the axial locking mechanism there is associated a form-fitting, axially withdrawable radial coupling R, R' for transmitting the torque of the spindle 30, 30' to the feed screw 24, 24'.

Figure 9:
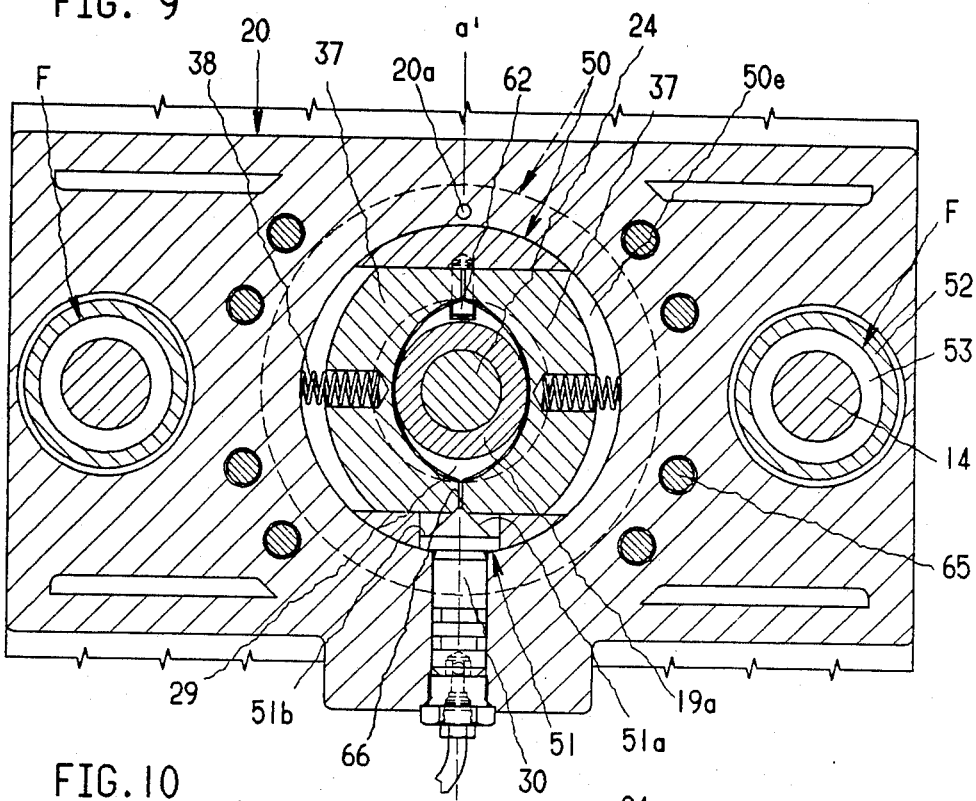
FIG. 9 is a sectional view taken along line IX—IX of FIG. 3.
Figure 10:
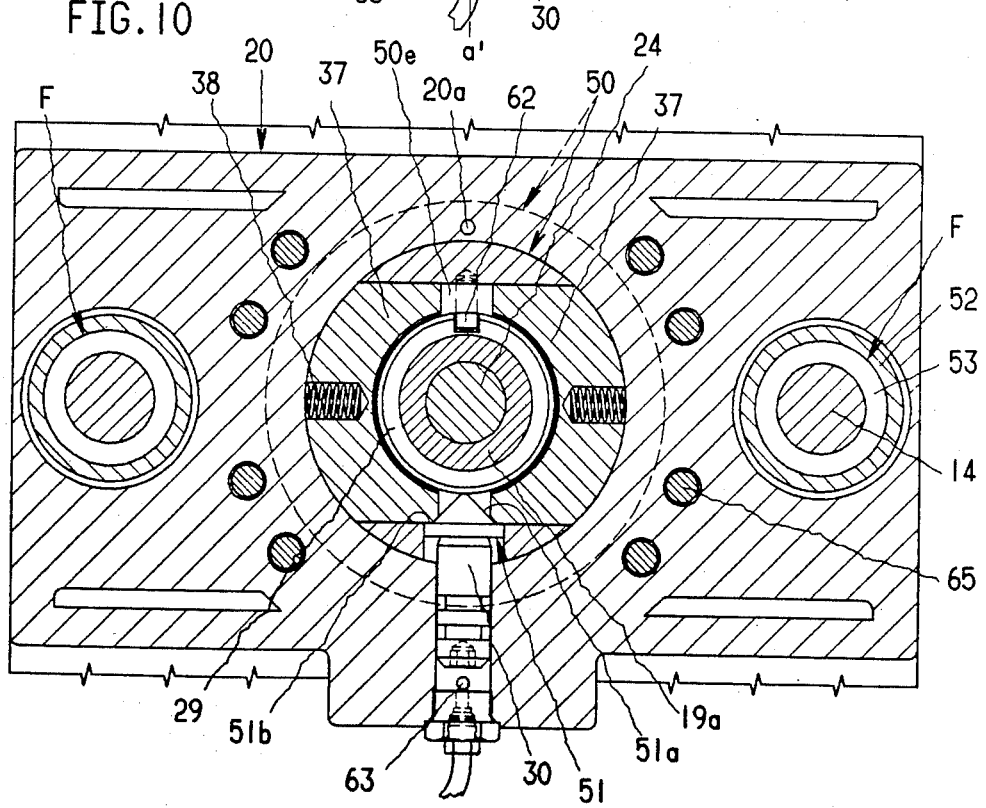
FIG. 10 is a view similar to FIG. 9, illustrating the structure in a disconnected state.

There is further provided an orienting device, by means of which the common rotary motion of the axial locking device (locking bolts 35g) and the radial coupling R, R' can be stopped at least approximately in a desired angular position of the clearance 66 between the two radially opposite locking bolts 35g (FIGS. 5, 7). The desired angular position corresponds to the radial working direction of the radial cylinder 30, 30'. The orienting device includes an inductive rpm signal receiver which has a transmitter segment 48 secured to a transmitting disc 47 as well as a stationary sensor 44a (FIG. 3). The latter cooperates with the transmitter segment 48 to generate a stop signal. The sensor 44b of the rpm signal receiver and the sensor 44a are accommodated in a housing 44 which is situated in a recess 43a of a connecting flange 43 and into which the sensor conductors 45 enter from the rear. The motor 41 supplying the torque for the spindle 31, 31' may be controlled in such a manner that the operational rpm required for the plasticizing of the synthetic material in the plasticizing unit 19 may be reduced to a rotary speed of approximately 20-30 rpm for facilitating withdrawal of the radial coupling R, R'. The radial coupling R, R' may be moved out with a reverse stroke of driving cylinders (power cylinders) F situated externally of the injection axis (FIGS. 2, 9, 10). For effecting such an arrangement of the driving cylinders F, the injection unit is supported axially displaceably on stationary columns 14 with the interposition of carrier bridges 20, 40. The stationary columns 14 are secured to the clamping plate of the mold closing unit. The pistons 53 of the driving cylinders F are firmly seated on the columns 14. The cylinder 52 proper of each power cylinder F and the cylinder 39 of the injection cylinder unit 34, 39 form with the carrier bridges 20, 40 a rigid unit which may be displaceable on the columns 14. The piston 34 of the injection cylinder unit 34, 39 and its piston rod 34a, 34a' are traversed by the spindle 31, 31' which continues in front as a coupling portion 31a (FIG. 3) or has a connecting head 31a' (FIG. 13). The spindle 31, 31' is fixedly connected with the drive shaft 41b of the motor 41 by a coupler 49. The motor 41 is, by means of a connecting flange 43, secured to the piston rod 34a, 34a' which is secured against rotation. The spindle 31, 31' is supported on the piston rod 34a, 34a' with the intermediary of an overrunning clutch 42. The spindle 31, 31' is thus rotatably supported within the piston rod 34a, 34a'. A radial flange of the spindle 31, 31' constitutes a connection, with the intermediary of a thrust bearing 74, 75

(FIGS. 13, 14), with the piston 34 for an axial displacement during the injection stroke.

As shown in FIGS. 1 and 2, the injection molding unit which is partially surrounded by a protective cover 21, is supported on rollers 13 of a support structure 12 mounted on the machine stand 10 provided with a cover 11. The injection molding unit thus rests, with the interposition of the cover 21, on the stationary support rollers 13 and thus rolls thereon during positioning or removal. The columns 14 are supported on the bearing 12 by means of clamping sleeves 15$b$, with the interposition of a bearing yoke 15.

As may be observed in FIGS. 1 and 2, the plasticizing unit 19 comprising the plasticizing cylinder 19$a$ and the feed screw 24 is surrounded by a sheet metal jacket 19$b$. The latter has a rectangular cross-sectional configuration and thus has a planar seating face 19$b'$ which lends a stable equilibrium to the plasticizing unit 19 supported on a horizontal web 15$a$ of the bearing yoke 15. The plasticizing cylinder 19$a$ released by the injection mold assembly 18 is supported and centered on two parallel support pins 17$c$ of the stationary mold carrier 17. The support pins 17$c$ extend parallel and symmetrically with respect to the injection axis A.

Considering FIGS. 2 and 2A together, it is seen that in the horizontal web 15$a$ of the support yoke 15 there is arranged a piston-and-cylinder unit (stopping cylinder) 15$i$ which has a rear cylinder cover 15$f$ and whose piston 15$e$ which is resettable by a return spring 15$d$ terminates in an arresting pin 15$c$. The latter may be advanced into a hole provided in the setting face 19$b'$ by energizing the piston 15$e$, for an axial immobilization of the plasticizing unit 19 positioned on the web 15$a$. In the immobilized state the plasticizing unit 19 is in an axial position which is adapted for performing a locking of the plasticizing cylinder 19$a$ and the feed screw 24, 24'.

With reference to FIGS. 4–8, 13 and 14, the axial locking mechanism for the feed screw 24, 24' comprises a carrier ring 35$b$, 35$b'$ which is coaxially affixed to the rotatable spindle 31, 31' and a rotationally symmetrical guide body 35$a$, 35$a'$ engaging the frontal side of the carrier ring 35$b$, 35$b'$. The carrier ring 35$b$, 35$b'$ and the guide body 35$a$, 35$a'$ are closely surrounded by a centering sleeve 35$c$, 35$c'$. Diametral guide tracks for the locking bolts 35$g$ are provided in the guide body 35$a$, 35$a'$ which further has a radial guide channel for the rotationally symmetrical expander wedge 35$d$ which is held in the guide channel and rotates with the guide body 35$a$, 35$a'$. The shaft of the feed screw 24, 24' is surrounded by an annular shoulder 35$h$ (FIGS. 6, 8), 35$h'$ (FIGS. 13, 14) of the guide body 35$a$, 35$a'$.

Radially guided and diametrically arranged slidable locking bolts 37, 37', 137 which are biased from the rear by springs 38, 138 are provided for an axial bolting of the plasticizing cylinder 19$a$, 19$a'$. The locking bolts 37, 37', 137 are movable from a coupling position by the radial cylinder 30 (FIGS. 3, 9, 10), 30' (FIGS. 13, 14) with the aid of an expander wedge 51, 51' which extends in an axial direction with a driving portion 51$c$ in the rotational plane a—a (FIG. 13) of the expander wedge 35$d$. The locking bolts 37, 37', 137 for the plasticizing cylinder 19$a$ and the locking bolts 35$g$ for the feed screw 24, 24' as well as the radial coupling R, R' are arranged in a centering block 20, 50, 20', 50'. The centering block is formed by an axial insertion of a centering body 50, 50' into a blind bore which is provided in the carrier bridge 20, 20' and which is concentric with the axis of injection. The carrier bridge and centering body are affixed to one another by a securing pin 20$a$ as well as a pin 62, 62'. The carrier bridges 20, 20' and 40 as well as the centering bodies 50, 50' are axially clamped to one another by tightening bolts 65. The expander wedge 51, 51' is supported in a radial passage of the centering body 50, 50'.

The momentary operational state of the axial locking devices for the plasticizing cylinder 19$a$, 19$a'$ and the feed screw 24, 24' is controllable by a switch 64, 64' actuated by the motion of the expander wedge 51, 51'.

In relation to the axial locking device (bolts 35$g$) and the radial coupling R, R', the coupling device according to the invention comprises two coupling parts which are axially relatively displaceable by means of the power cylinder F. One of the coupling parts is mounted on the conveyor screw 24, 24' and comprises an annular groove 24$a$ and an engagement profile for the radial coupling which, in the embodiment according to FIGS. 1–12, is formed by the radial groove 25 and in the embodiment shown in FIGS. 13–18 is formed by the actuating surfaces 124$a$. The other coupling part which is fixedly mounted on the spindle 31, 31' comprises the bolt housing 35, 35', the locking bolts 35$g$ and the engagement profiles for the radial coupling R, R' which, in the embodiment according to FIGS. 1–12 comprises the carrier pin 26 and in the embodiment according to FIGS. 13–18 is formed of the carrier surfaces 35$m$. Upon axial immobilization of the plasticizing unit 19 on the web 15$a$ of the support yoke 15, whereby the components are ready for the locking operation, the axial position of the coupling part on the feed screw 24, 24' is also determined. Thus, one coupling part, together with the remaining parts of the injection molding unit, may be moved towards the other coupling part by the power cylinders F for performing the locking operation and, in case of unlocking, it may be accordingly moved away therefrom. When the coupling halves are at their maximum distance from one another, a conveyance of the plasticizing unit 19 transversely to the axis of injection may take place.

In the description which follows, the differences between the first preferred embodiment illustrated in FIGS. 1–12 and the second preferred embodiment shown in FIGS. 13–18 will be set forth.

In the first embodiment, shown in FIGS. 4, 6, 7 and 8, the engagement profiles of the radial coupling R are, on the one hand, formed by a radial groove 25 in the end face of the shaft of the feed screw 24 and, on the other hand, by a radial carrier pin 26 which traverses the axis of injection and connects the carrier ring 35$b$ in a torque-transmitting manner with the coupling part 31$a$ of the spindle 31. With reference to FIGS. 3, 9 and 10, the piston of the radial cylinder 30 engages directly the expander wedge 51 which, in turn, directly contacts the control switch 64. The locked feed screw 24 is at its rear centered by its end portion (FIGS. 4, 6, 8) projecting into a recess 36 of the coupling portion 31$a$. For locking the plasticizing cylinder 19$a$ there are provided two diametrical locking bolts 37 projecting into an annular groove 29 of the plasticizing cylinder 19$a$.

In the second preferred embodiment illustrated in FIGS. 13–18 the engagement profiles of the radial coupling R' are formed, on the one hand, by planar carrier surfaces 124$a$ on the terminal portion 124 of the feed screw 24' and, on the other hand, by cooperating carrier surfaces 35$m$ in a recess 35$i$ of the carrier ring 35$b$. As may be seen in FIGS. 16 and 17, the carrier faces 124$a$ are connected, with the intermediary of oblique faces 124b, to a terminal face 124d of the feed screw 24'. The terminal face 124d is oriented perpendicularly to the carrier faces 124a. The cooperating carrier faces 35m which bound the recess 35i in the carrier ring 35b', are connected, with the intermediary of oblique faces 35k to an end face which terminates the carrier ring 35b' and which is oriented perpendicularly to the carrier faces 35m. The oblique faces 124b and 35k are so configured and arranged that upon an axial meeting of the oblique faces 124b and 35k during penetration of the radial coupling R' by means of a relative rotation of the engagement profiles, an adjustment for the "standby-for-locking" position occurs which corresponds to the desired angular position of the clearance 66 between the locking bolts 35g (FIGS. 5, 7).

Figure 14:
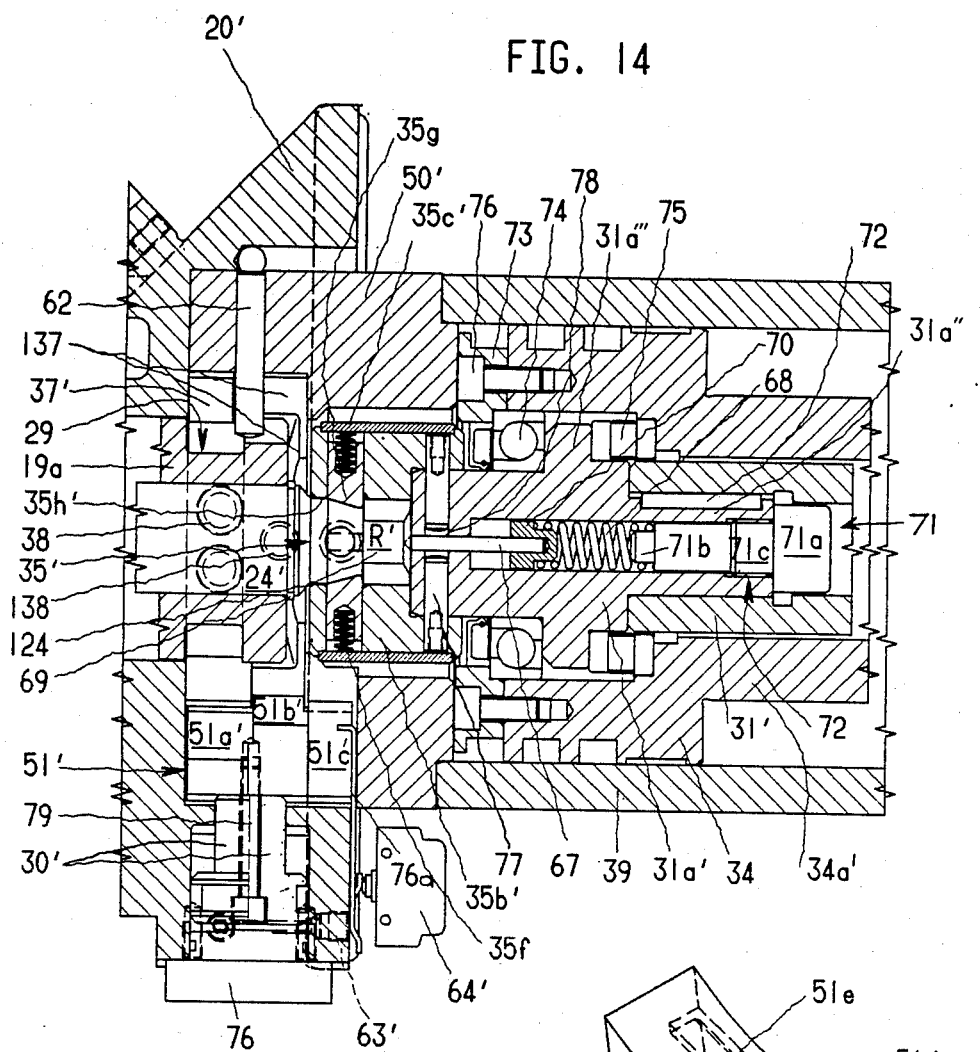
FIG. 14 is a sectional view of the structure illustrated in FIG. 13, taken along a plane oriented at 90° to the plane of the drawing of FIG. 13.
Figure 15:
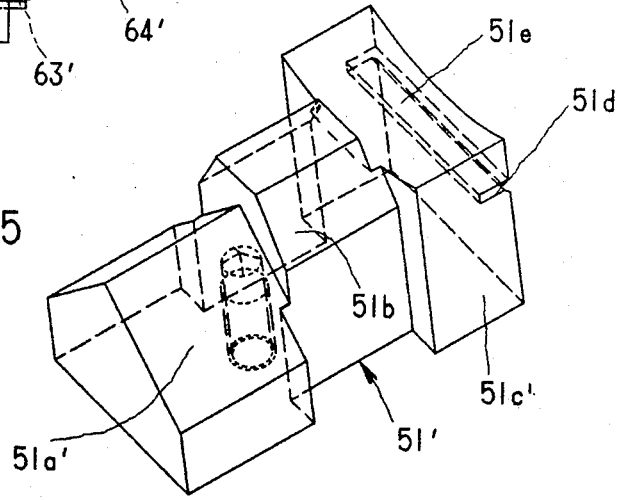
FIGS. 15 and 16 are perspective views of components shown in FIGS. 13 and 14, illustrated on an enlarged scale.
Figure 16:
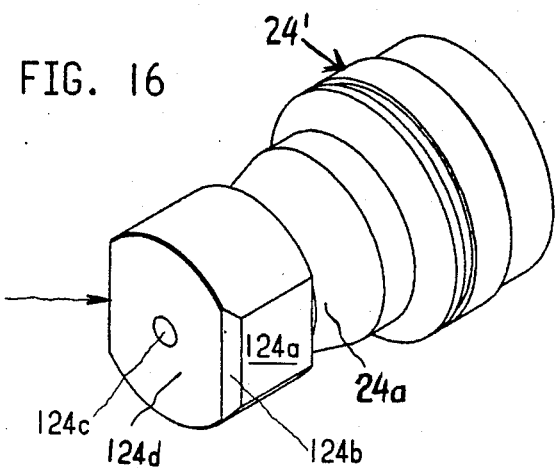
Figure 17:
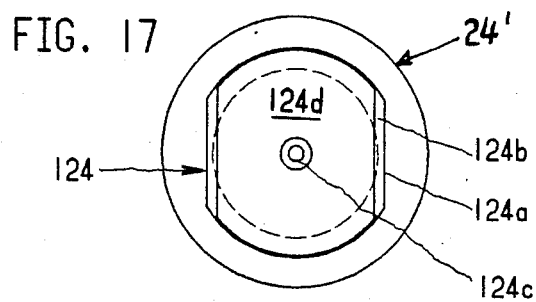
FIGS. 17 and 18 are end views of components, on an enlarged scale, illustrated in FIGS. 13 and 14.
Figure 18:
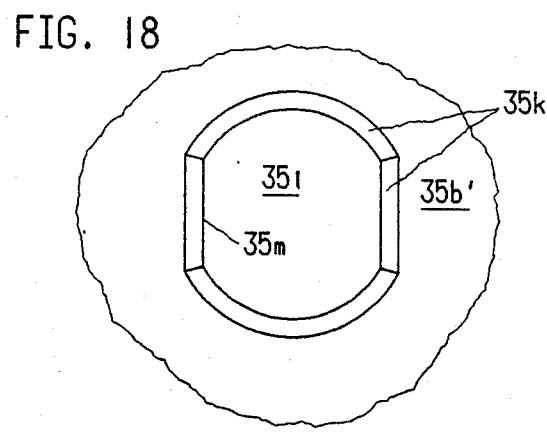

For the axial interlock of the plasticizing cylinder 19a there are provided, in addition to the locking bolts 37' projecting into an annular groove 29 of the plasticizing cylinder 19a, further locking bolts 137 which engage behind the plasticizing cylinder 19a and which are arranged in another radial plane. Therefore, as shown in FIG. 15, the expander wedge 51' comprises, in addition to the working part 51c for the expander wedge 35d, inclined faces 51a' and 51b' to control the locking bolts 37' projecting into the annular groove 29a and to control the locking bolts 137 engaging therebehind. The radial cylinder 30' provided with a rearward cylinder closure 76 is fixedly attached to the expander wedge 51' by means of a securing screw 79. The expander wedge 51' actuates the control switch 64' by means of a switching strip 76a which is anchored in a groove 51d of the drive portion 51c'. The spindle 31' is torque-transmittingly connected with the carrier ring 35b' with the intermediary of a connecting head 31a' by means of radial carrier pins 77, as shown in FIG. 14. In the connecting head 31a' there is coaxially arranged an axially displaceable ejector pin 67 which projects with a centering tip into a corresponding centering opening 124c of the feed screw 24' for effecting centering, as shown in FIG. 14. The ejector pin 67 is, at its rear terminus, biased by a coil spring 68 which engages a centering support cap 70 of the ejector pin 67 and is countersupported at its rear terminus by a pin 71 having a centering projection 71b. The pin 71 is threadedly connected, by means of a threaded portion 71c, with an axial flange 31a" of the connecting head 31a' and is thus axially supported thereby. The pin 71 engages the axial flange 31a" with a head 71a. The coil spring 68 may be biased to a variable extent by replacing the pin 71 with a longer or shorter one. The connecting head 31a' is coupled with the piston 34 by means of a radial flange 31a'" for an axial co-travel with the piston 34. The radial flange 31a'" engages radial shoulders of the piston 34 with the interposition of thrust bearings 74, 75.

The foremost position of the feed screw 24' during its axial displacement in the direction of injection is limited by a stop abutting the plasticizing cylinder 19a when its forwardmost position is reached. As shown in FIGS. 13 and 14, the stop is formed by a Seeger ring (circlip ring) 69, one half of which is received in an annular groove of the feed screw 24' and which, in the forwardmost position of the feed screw 24', engages the plasticizing cylinder 19a with its radially outwardly projecting half. If the spindle-side coupling part (the bolt housing 35, 35') is, with the locking bolts 35g as well as with the engagement profiles of the radial coupling R, R' axially moved away by an axial stroke (advancing stroke) from the other coupling half mounted on the conveyor screw 24, 24' for the purpose of disconnection and for freeing the plasticizing unit 19 for a transverse conveyance, the feed screw 24' is held in the frontal (forward) position by the ejector pin 67.

The expander wedge 35d rotating together with the guide body 35a' may be engaged by a concave work face 51e of the working component 51c of the expander wedge 51' with a centering angle of at least 5° but preferably greater than 10°. Such an operation is ensured by the fact that the working part 51c extends over a correspondingly large centering angle. In this manner there is obtained a release (disconnection) of the feed screw even if the desired angular position of the clearance 66 between the locking bolts 35g is effected by the orienting device only to an approximate extent.

The expander wedge 51' actuates the control switch 64' with the intermediary of a switching strip 76a anchored in a groove 51d of the drive component 51c', whereby a signal is generated when either the locking position or the release position is reached.

Assuming a normal injecting operation, in the two described preferred embodiments of the coupling device the program of a computer controlling the exchange of the plasticizing unit 19 may provide for performing the following steps: First, the rotary speed of the motor 41 is reduced from the normal operating rpm to the disconnecting rpm. Thereafter, in the orienting device the stop signal is generated which interrupts the circuit of the motor 41. Subsequently, by means of a radial stroke of the radial cylinder 30, 30' all the slidable locking bolts 37, 37', 137, 35g are moved, as urged by the expander wedges 51, 51', 35d, out of their locking position and simultaneously the plasticizing unit 19 is axially immobilized with the aid of the stop cylinder 15i. Thereafter, the remaining parts of the injection molding unit is, together with the associated coupling portion (without the axially stopped plasticizing unit 19 with the associated coupling part), moved axially by the reverse stroke of the power cylinder F to such a distance from the plasticizing unit 19 that the latter may be freely transported transversely. The rearward terminus of the plasticizing cylinder 19a is freed from the centering block 20, 50, 20', 50'. Thereafter, the plasticizing unit 19 is conveyed away. In the latter the engagement profiles of the radial coupling R, R' of the feed screw 24, 24' have at least approximately their desired angular position which corresponds to the desired angular position of the engagement profiles and the locking bolt clearance 66 in the spindle-side coupling part. The feed screw 24, 24' remains in such an approximate desired angular position in storage and during shipment; it thus remains preserved for a further use of the plasticizing unit 19. Such a "preserving" of the desired angular position of the feed screw is ensured in any event by the synthetic material that remains and hardens in the plasticizer cylinder and is ensured even if, prior to the beginning of the exchange procedure the plasticizing cylinder has not been emptied by ejecting therefrom the plastic material.

The plasticizing unit taken from storage and having a setting face 19b' is set from the rear in a stable manner onto the web 15a of the support yoke 15, while it is supported at the nozzle side on the support pins 17c. Insofar as the locking bolts 37, 37', 137; 35g are not already in the releasing position, they are moved thereinto by a stroke of the radial cylinder 30, 30'. At the same time, the plasticizing unit 19 is axially immobilized by means of the stopping cylinder 15i whose cylinder chamber is in communication with the cylinder chamber of the radial cylinder 30, 30'. Thereafter the injection molding unit is, by means of a forward stroke of the power cylinders F, moved into an axial position shown in FIGS. 3, 13, 14 in which the radial coupling R, R' is advanced into engagement and the feed screw 24, 24' is in its frontal (forwardmost) position. Upon advancing the radial coupling R, R', the oblique faces 124b, 35k cause a slight relative rotary motion of the coupling parts and thus effect an adjustment of the approximate desired angular position into the exact desired angular position. Thereafter, the radial cylinder 30, 30' is depressurized, whereby the locking bolts 37, 37', 137, 35g are moved by the springs 38, 138, 35f into the locking position. At the same time, the stop cylinder 15i releases the plasticizing cylinder for permitting it to execute an axial motion, by moving the stopping pin 15c out of the hole of the setting face 19b with the aid of the return spring 15d.

In the preferred embodiments, the desired angular position coincides with the vertical symmetry plane a'—a' of the system (FIGS. 5, 7 and 9).

It will be understood that the above description of the present invention is susceptible to various modifications, changes and adaptations, and the same are intended to be comprehended within the meaning and range of equivalents of the appended claims.

What is claimed is:

1. An injection molding machine, having an axis of injection, comprising
    (a) a working unit adapted to be automatically exchanged as a whole and arranged for removal from and introduction into the machine in a direction transverse to said axis; said working unit including
        (1) an injection mold assembly; and
        (2) a plasticizing unit including a plasticizing cylinder and a feed screw received in said plasticizing cylinder and arranged for a rotary motion and an axial shifting motion relative to said plasticizing cylinder; said feed screw having a working position coaxial with said axis of injection;
    (b) a drive means for imparting a rotation and a periodic axial shifting motion to said feed screw; said drive means including a spindle oriented coaxially with said axis of injection;
    (c) a coupling means for operatively connecting said feed screw to and disconnecting it from said spindle; said coupling means including
        (1) a bolt housing connected to said spindle for rotation coaxially with said axis of injection;
        (2) locking bolts received in said bolt housing and arranged diametrically relative to said axis of injection; said locking bolts being radially displaceable into a locking position and a releasing position;
        (3) a radial clearance defined between said locking bolts;
        (4) spring means connected to said locking bolts for urging said locking bolts into said locking position thereof;
        (5) a radially guided expander wedge cooperating with said locking bolts and having a working position in which said expander wedge is advanced in said radial clearance, driving said locking bolts away from one another by camming action into said releasing position against a force of said spring means;
        (6) a radially oriented piston-and-cylinder unit connected to said expander wedge for moving said expander wedge into the working position thereof; said piston-and-cylinder unit having a radial working direction;
        (7) an axially displaceable radial coupling having a working position;
        (8) a coupling component forming a fixed part of said feed screw; said coupling component having
            (i) a circumferential groove being coaxial with said axis of injection in the working position of said feed screw; said locking bolts projecting into said circumferential groove in said locking position thereof for axially immobilizing said feed screw relative to said spindle; and
            (ii) a radial recess arranged for receiving said radial coupling in the working position thereof for torque-transmittingly connecting said feed screw with said spindle; and
    (d) an orienting means for stopping a common rotation of said bolt housing and said radial coupling in a desired angular position of said clearance in which said clearance is oriented parallel to said working direction of said radially oriented piston-and-cylinder unit.

2. An injection molding machine as defined in claim 1, wherein said orienting means comprises an inductive rpm signaller including a transmitter disc and a transmitter segment affixed to said transmitter disc; further comprising a stationary sensor cooperating with said transmitter segment for generating a stopping signal; said drive means including an rpm-regulatable spindle drive motor connected to said spindle, whereby a normal operational spindle rpm is reducible to an rpm more favorable for moving said radial coupling out of its said working position.

3. An injection molding machine as defined in claim 1, further comprising centering means for centering said feed screw relative to said spindle.

4. An injection molding machine as defined in claim 1, wherein said plasticizing unit has an external planar setting face, and said machine has a horizontal support arranged for a face-to-face engagement with said planar setting face when said plasticizing unit is deposited on said support; further comprising an arresting means for immobilizing said plasticizing unit on said support in a predetermined axial position constituting a standby position for an operation of said coupling means.

5. An injection molding machine as defined in claim 1, further comprising a power cylinder situated externally of said axis of injection; said power cylinder being connected to coupling halves of said coupling means for axially moving the coupling halves relative to one another; said coupling halves having a maximum axial distance from one another; said plasticizing unit having a clear transporting path transversely to said axis of injection when said coupling halves are at said maximum distance from one another.

6. An injection molding machine as defined in claim 5, further comprising an abutment means lying against said plasticizing cylinder and determining a forwardmost limit position for said feed screw in the axial displacement thereof; further comprising a spring-biased ejector pin being coaxial with and supported on said spindle; said ejector pin being arranged for holding said feed screw.

7. An injection molding machine as defined in claim 1, wherein said locking bolts, said spring means and said expander wedge form part of an axially immobilizing coupling assembly; said axially immobilizing coupling assembly further including
  (a) a carrier ring coaxially affixed to said spindle;
  (b) a rotationally symmetrical guide body being in engagement with said carrier ring; said guide body including diametrical guide tracks accommodating said locking bolts and a radial guide channel receiving said expander wedge; said guide body forming part of said bolt housing; and
  (c) a centering sleeve closely surrounding said guide body and said carrier ring.

8. An injection molding machine as defined in claim 7, wherein said radial coupling comprises a radially oriented carrier pin torque-transmittingly connecting said spindle with said carrier ring; said coupling component forming a fixed part of said feed screw including a radial groove receiving said carrier pin in said working position of said radial coupling.

9. An injection molding machine as defined in claim 7, wherein said radial coupling comprises first carrier faces formed in a recess of said carrier ring; said coupling component forming a fixed part of said feed screw including second, planar carrier faces being in a torque-transmitting engagement with said first carrier faces in said working position of said radial coupling.

10. An injection molding machine as defined in claim 9, said carrier ring having a radial end face and said coupling component forming a fixed part of said feed screw having a radial end face; further comprising first oblique faces connecting said first carrier faces with said radial end face of said carrier ring and second oblique faces connecting said second carrier faces with said radial end face of said coupling component; said first and second oblique face cooperating with one another upon axial movement of said radial coupling into said working position for effecting a radial adjustment to align said first carrier faces with said second carrier faces in said working position of said radial coupling.

11. An injection molding machine as defined in claim 1, wherein said locking bolts are first locking bolts, said spring means is a first spring means and said expander wedge is a first expander wedge; said first locking bolts, said first spring means and said first expander wedge forming part of a first axially immobilizing coupling assembly; said coupling means further comprising a second axially immobilizing coupling assembly arranged for axially locking said plasticizing cylinder to said spindle; said second axially immobilizing coupling assembly including
  (a) second locking bolts arranged diametrically relative to said axis of injection; said second locking bolts being radially displaceable into a locking position and a releasing position; in said locking position said second locking bolts being in a direct engagement with said plasticizing cylinder;
  (b) second spring means connected to said second locking bolts for urging said second locking bolts into said locking position thereof; and
  (c) a radially guided second expander wedge cooperating with said second locking bolts and having a working position in which said second expander wedge is advanced between said second locking bolts for driving said second locking bolts away from one another by camming action into said releasing position against a force of said second spring means; said second expander wedge having a drive component extending into a rotational plane of said first expander wedge; said second expander wedge being operatively connected with said radially oriented piston-and-cylinder unit for moving said second expander wedge into the working position thereof.

12. An injection molding machine as defined in claim 11, further comprising a centering block accommodating said coupling means and having a central bore axially slidably receiving said plasticizing cylinder and a radial channel receiving said second expander wedge.

13. An injection molding machine as defined in claim 11, further comprising a control switch operatively connected to said radially oriented piston-and-cylinder unit for controlling radial positions of said first and second expander wedges to thereby control radial positions of said first and second locking bolts.

14. An injection molding machine as defined in claim 11, wherein said drive component of said second expander wedge has a concave working face; said first expander wedge being arranged to be engageable by said concave working face at a centering angle of at least 5°.

* * * * *